(12) United States Patent
Nashif et al.

(10) Patent No.: US 9,152,940 B2
(45) Date of Patent: Oct. 6, 2015

(54) METHOD AND APPARATUS FOR OPTIMIZED SHIPPING STRATEGIES ACCOUNTING FOR ENDPOINT REQUIREMENTS

(76) Inventors: Hazem Nizar An Nashif, Oakland, CA (US); Thomas Frederick Brady, Chattanooga, TN (US)

( * ) Notice: Subject to any disclaimer, the term of this patent is extended or adjusted under 35 U.S.C. 154(b) by 714 days.

(21) Appl. No.: 13/068,940

(22) Filed: May 24, 2011

(65) Prior Publication Data
US 2012/0303156 A1    Nov. 29, 2012

(51) Int. Cl.
*G06F 7/00* (2006.01)
*G06Q 10/08* (2012.01)

(52) U.S. Cl.
CPC ..................... *G06Q 10/08* (2013.01)

(58) Field of Classification Search
USPC .......................................... 700/216, 214, 213
See application file for complete search history.

(56) References Cited

U.S. PATENT DOCUMENTS

| | | |
|---|---|---|
| 4,692,876 A | 9/1987 | Tenma et al. |
| RE33,416 E | 10/1990 | Konishi et al. |
| 5,501,571 A | 3/1996 | Van Durrett et al. |
| 5,636,966 A | 6/1997 | Lyon et al. |
| 5,903,464 A | 5/1999 | Stingel, Jr. et al. |
| 6,425,226 B1 | 7/2002 | Kirschner |
| 6,505,093 B1 * | 1/2003 | Thatcher et al. .............. 700/216 |
| 7,266,422 B1 | 9/2007 | DeMotte et al. |
| 7,356,495 B2 | 4/2008 | Beigl et al. |
| 7,363,104 B2 * | 4/2008 | Stevens .......................... 700/213 |
| 7,591,630 B2 | 9/2009 | Lert, Jr. |
| 7,603,291 B2 | 10/2009 | Raiyani et al. |
| 7,657,467 B2 | 2/2010 | Deganis et al. |
| 7,877,164 B2 | 1/2011 | Grunbach et al. |
| 7,991,505 B2 | 8/2011 | Lert, Jr. et al. |
| 8,055,377 B2 | 11/2011 | Yair et al. |
| 8,468,781 B2 | 6/2013 | Fritzsche et al. |
| 2008/0120129 A1 | 5/2008 | Seubert et al. |
| 2010/0178149 A1 | 7/2010 | Fritzsche |
| 2011/0106296 A1 | 5/2011 | Stevens et al. |
| 2012/0101627 A1 * | 4/2012 | Lert ............................... 700/216 |

FOREIGN PATENT DOCUMENTS

WO      WO 00/68856      11/2000

OTHER PUBLICATIONS

International Search Report and Written Opinion dated Sep. 28, 2012 for Application No. PCT/US2012/039291.
Dematic Logistics Review, Issue 1, 2010.
Dematic, "Dematic's Insight reveals smarter, faster, safer order picking," press release, Sep. 24, 2010 (downloaded from http://www.industrysearch.com.au/dematic-s-insight-reveals-smarter-faster-safer-order-picking/n/46977).
Dematic AMCAP—Product Details, Mar. 15, 2011 (downloaded http://www.remastersys.com/sale/pz2c2597a-z1b0ed9-dematic-amcap.html).

(Continued)

*Primary Examiner* — Yolanda Cumbess (57) ABSTRACT

The cartonization process in a distribution center can be modified to account for factors which influence the efficiency with which the products distributed from the distribution center can be stocked onto store shelves, such as layout (i.e., planogram) information indicating where the various products will actually be located in a store.

23 Claims, 5 Drawing Sheets
(1 of 5 Drawing Sheet(s) Filed in Color)

(56) References Cited

OTHER PUBLICATIONS

Fastener & Fixing Europe—Issue 53—Yudu, published Sep. 2008 (downloaded from http://publishing.yudu.com/Apuoa/ffe53sept2008/resources/141.htm).

Dematic, "Dansk Supermarked Gruppen Places Significant order with Dematic for Highly Flexible, High Productivity Order Assembly System," press release, May 5, 2009 (downloaded from http://www.prweb.com/releases/Logistics/Retail/prweb2381934.htm).

"Dematic developpe le systeme de palettisation automatique de palettes heterogenes le plus rapide du monde: l'AMCAP" press release, 2008 (downloaded from http://www.faq-logistique.com/Communique-presse20080219-Dematic-Palettisation-Automatique-AMCAP.htm).

Dematic brochure "Dematic AMCAP—Mischpaletten automatisch kommissioniert", 2008 (downloaded from http://donar.messe.de/exhibitor/cemat/2011/124834/dematic-amcap-palettiersystem-fur-mischpaletten-ger-133266.pdf).

McMahon, J., "Maximizing Efficiency of Store-Friendly Pallets Mixed-Case Palletizing", Logistics Online Newsletter, Jan. 26, 2010 (downloaded from http://www.logisticsonline.com/doc/maximizing-efficiency-store-friendly-pallets-0002).

Trebilcock, B., "Automation: Kroger changes the distribution game", Jul. 4, 2011 (downloaded from http://www.supplychain247.com/article/automation_kroger_changes_the_game/0).

Lacefield, S.K., "10 tips for improving piece picking: '6. Be store friendly'", DC Velocity, Material Handling, Feb. 25, 2010, 3 pgs.

Kurt Salmon Associates, "Survey of Supply Chain Effectiveness", p. 29, Nov. 12, 2002, 50 pgs.

Holste, C., "Logistics News: DCs Facing New Customer Service Challenges", Supply Chain Digest, Jul. 14, 2010, 2 pgs. downloaded from http://www.scdigest.com/assets/Experts/Holste_10-07-14.php.

Ii-Choe, K. et al., "Small Parts Order picking: Design and Operation", School of Industrial and Systems Engineering Georgia Institute of Technology, 1991, Georgia tech Research Corp., Atlanta, GA, 41 pgs.

\* cited by examiner

METHOD AND APPARATUS FOR OPTIMIZED SHIPPING STRATEGIES ACCOUNTING FOR ENDPOINT REQUIREMENTS

FIELD

The disclosure set forth herein can be used to implement technology in the field of material handling, particularly as it relates to packaging of items for shipment.

BACKGROUND

Historically, break-pack store replenishment has involved the shipment of products in containers which are packed according to the manner in which the products are stocked in a distribution center (DC). In the DC, products are stocked to maximize efficiency (e.g., as measured by minimal travel time) picking. By contrast, the product layout for a store (often referred to as a "planogram") is generally designed to maximize sales (e.g., by creating a pleasing in-store visual experience, and/or maximizing the likelihood of impulse purchases by shoppers). As a result, the layouts for products used in stores and distribution centers are generally not the same, leading to inefficiencies when products packaged according to the DC stocking scheme are used for store replenishment.

The need to avoid inefficiencies in store replenishment caused by differing layouts in stores and DCs is well known in the industry. Past efforts to meet this need have involved synchronizing store layouts with the stocking scheme used in the DC. However, this requires all of the stores serviced by a DC to have the same layout. In practice, this requirement means that attempts to synchronize DC and store layouts will be ineffective, as there is substantial inter-store variation in layouts due to factors such as markets serviced, store age, and store type. Accordingly, there is a long felt but unmet need in the art for technology which can allow a distribution center to service multiple stores having different layouts without decreasing the efficiency of replenishment at the individual stores.

SUMMARY

The technology disclosed herein can be used in a variety of manners, including implementation of a machine for fulfillment of orders in a distribution center. Such a machine might comprise a pick face adapted to allow products to be taken from the pick face and placed into containers, a conveyor to convey containers from the pick face to one or more additional locations in a distribution center, and a means for determining a plan for placing products into containers based on how the products will be used in store replenishment.

The technology could be used to implement a method comprising receiving a fulfillment order specifying a plurality of products to be used in store replenishment, determining a plan for placing products from the plurality of products into containers based on how the products will be used in store replenishment, and outputting instructions to a picking system indicating products which should be placed into containers based on the plan.

Of course, it should be understood that the examples give above are intended to be illustrative only, and should not be treated as limiting on the scope of protect afforded by the claims in this document, or in any document claiming the benefit of this disclosure. As will be immediately apparent to one of ordinary skill in the art in light of the disclosure set forth herein, additional machines, methods and articles of manufacture are contemplated by the inventors, and could be implemented without undue experimentation in light of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The drawings and detailed description which follow are intended to be merely illustrative and are not intended to limit the scope of the invention as contemplated by the inventors.

DETAILED DESCRIPTION

The inventors have conceived of novel technology which, for the purpose of illustration, is disclosed herein as applied to modifying the cartonization process to account for disparate layouts at individual stores. While the application of the inventors' technology in this context satisfies a long-felt but unmet need in the art, it should be understood that the disclosure of the inventors' technology in this context should not be treated as implying limitations on how the inventors' technology can be beneficially applied. For instance rather than (or in addition to) being useful in accounting for disparate layouts at individual stores, the technology disclosed herein could also be used to account for other requirements that vary between endpoints. As an example, consider the case where inventory is being packaged into kits which will later be assembled into some finished good (e.g., a computer). In such a case, aspects of the technology disclosed herein could be used to account for the fact that the selection and packaging for components that will be used in a first kit could be different than the selection and packaging for components that will be used in the second kit, even though the first and second kits might both draw from the same basic inventory of components. Accordingly, the disclosure set forth herein should be understood as being illustrative only, and not limiting.

Figure 1:
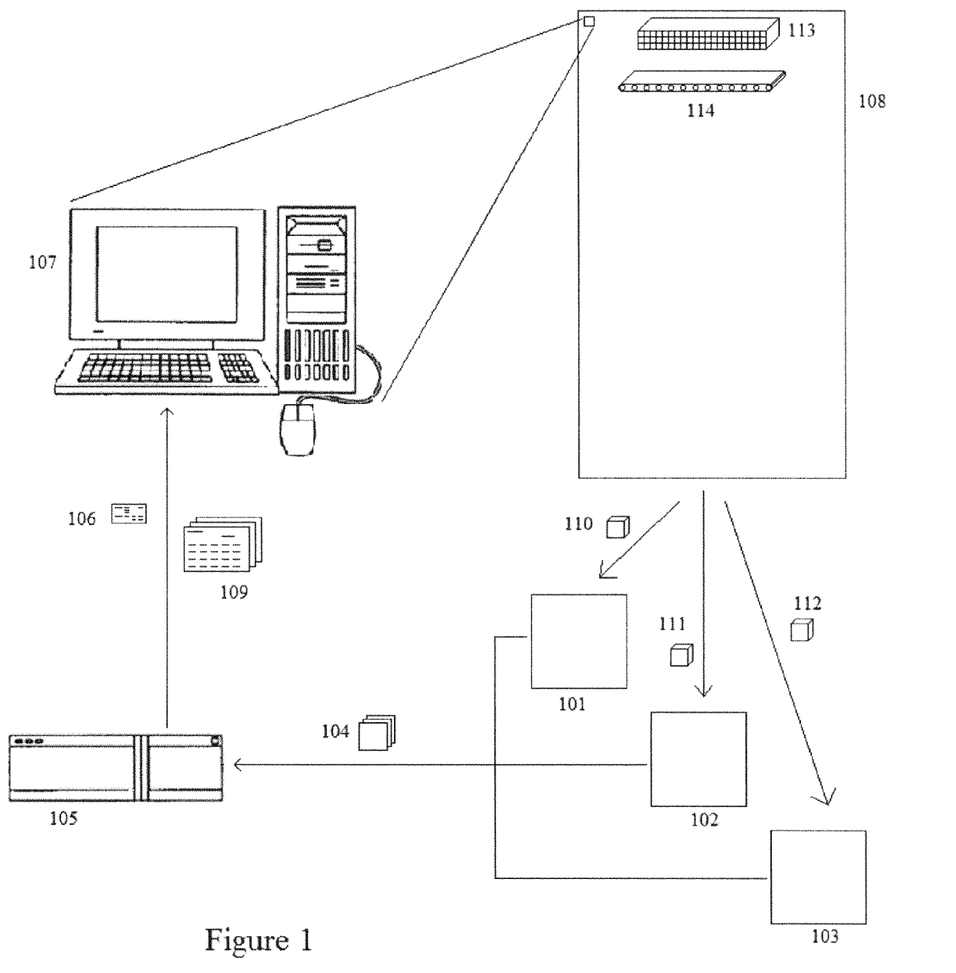
FIG. 1 provides a high level illustration of systems and communications which could be involved in using certain aspects of the disclosed technology

Turning first to the figures, FIG. 1 provides a high level illustration of components and communications which could be involved in using certain aspects of the disclosed technology. In that figure, there is a plurality of stores [101][102][103], from which consumers could purchase various goods. As goods are purchased, and the store inventories are depleted, the stores [101][102][103] report information reflecting the inventory changes [104], such as by sending sales records to a central server [105] for their chain. Please note that, although FIG. 1 depicts only one store [102] sending inventory information [104], it is possible that multiple stores [101][102][103] could send inventory information [104] as well, such as by combining it into a single communication before sending it to a sever [105], or by having each store individual send messages with inventory information to the central server [105]. The server [105], could integrate the inventory information [104] from the stores [101][102][103], and use it to create one or more replenishment orders for the chain's suppliers (not shown), as well as a fulfillment order [106] for a computer running the warehouse control software [107] for the DC [108] servicing the stores [101][102][103]. The computer running the warehouse control software [107] could use the fulfillment order [106], potentially along with planogram information [109] for the stores [101][102][103] to control cartonization so that the physical products [110] [111][112] shipped to the stores [101][102][103] would be shipped using the same organization with which they are stocked on the stores' shelves. This cartonization control could be accomplished, for example, by the computer running pick to light software which would cause the illumination of lights on the ends of a pick face [113] showing how many units of a particular item should be added to a carton. The same software could also instruct warehouse workers when a carton should be closed and placed on a takeaway conveyor [114] for transport to other areas of the DC for further processing and/or loading for shipment.

Of course, although FIG. 1 illustrates only a single pick face [113] and takeaway conveyor [114] for DC [108], in practice, a DC would likely include multiple picking technologies depending on factors such as the particular products handled by the DC [108]. For example, in practice, some products might be handled using pick to light, others might be handled on RF terminals, others might be handled using cross belt or tilt tray systems, and so on. While the description below describes how the inventors' technology can be implemented in the context of a single fulfillment system, the technology is not limited to the single system context, and could easily be extended to the context of a DC with multiple integrated fulfillment systems. For example, items could be added to a carton in a first area, followed by the carton being transported to other areas for the items from those areas to be added. The workers who are actually adding items to the carton would not need to be aware of the fact that the back end algorithm which produces the instructions for what items to add to which carton, or for where a carton should be routed next, produces those instructions based on the approaches set forth herein, rather than using conventional approaches. Accordingly, the discussion set forth herein should not be treated as implying that the disclosed technology is limited to any specific approach to fulfilling orders, or that it could not be applied where multiple approaches are used.

An example of a fulfillment order [106] which could be provided to a computer running the warehouse control software [107] for a DC [108] is provided below in table 1.

TABLE 1

Exemplary order information

| Order Header | Store 1001 100 Main St Anywhere USA | | Pty-1 |
|---|---|---|---|
| Order Detail | SKU 1234 | Qty 1 | Description Herbal Essence Shampoo 16 oz |

Note that, in the order of table 1, the information provided comprises stock keeping units ("SKUs"), as well as the requested quantities for the SKUs for a particular store. So that the SKUs can be packaged in a form which is convenient for the particular stores, in some embodiments, it is possible that the fulfillment order will include information indicating how the SKUs should be packaged. For example, the SKUs could be listed in the fulfillment order in the same order in which they should be packaged for shipment. Similarly, there could be multiple fulfillment orders reflecting different packages which should be used for shipping the products being ordered. This will allow the organization maintaining the central server [105] to exert a greater degree of control over the cartonization process, with consequent opportunities for that organization to increase the efficiencies in operating its supply chain.

Of course, it should be understood that it is not necessary for order information, such as shown in table 1, to include packaging or layout information as described above. For example, in many cases, the central server [105] will be part of an inventory management system which was designed to create orders that would be fulfilled using prior art technology. As a result, the SKU information in an order created by such a system will most likely be in SKU sequence, with no consideration given to how the products should be packaged or stocked on store shelves. In such a situation, it is possible to accommodate the use of packaging strategies tailored to different endpoints by providing separate endpoint information, such as the planogram information [109] illustrated in table 2.

TABLE 2

Exemplary planogram information

| WCS Family Group Table | | | Adjacency | | |
|---|---|---|---|---|---|
| Store | SKU | Position | Micro Plan | Macro Plan | Family Group |
| 1001 | 1215 | SH1 | Shampoo | Basic Hair | Hair Care |
| 1001 | 1845 | SH2 | Shampoo | Basic Hair | Hair Care |
| 1001 | 2475 | SH3 | Shampoo | Basic Hair | Hair Care |
| 1001 | 3105 | SH4 | Shampoo | Basic Hair | Hair Care |
| 1001 | 1530 | SH5 | Shampoo | Basic Hair | Hair Care |
| 1001 | 2160 | SH6 | Shampoo | Basic Hair | Hair Care |
| 1001 | 2790 | SH7 | Shampoo | Basic Hair | Hair Care |
| 1001 | 2916 | SH8 | Shampoo | Basic Hair | Hair Care |
| 1001 | 1341 | SH9 | Shampoo | Basic Hair | Hair Care |
| 1001 | 1971 | SH10 | Shampoo | Basic Hair | Hair Care |
| 1001 | 2601 | SH11 | Shampoo | Basic Hair | Hair Care |

In cases where separate planogram information [109] is provided, if there is a need to combine it with the order information to determine a shipping strategy, this combination can easily be performed. For example, in cases where the planogram information [109] and fulfillment orders [106] are stored as relational database tables, a simple JOIN command based on store and SKU fields can be used. However, creating combined records will not necessarily be required in all implementations. For example, in a case where a shipping strategy is created based on sorting the items in the shipping order, the sort could be performed by, for each item in the order, doing a lookup against the planogram information [109] to identify how that item should be sorted. Other variations (e.g., sending separate information that is used to determine how SKUs are organized where that separate information is not planogram information) are also possible. Accordingly, the discussion above regarding integration of information such as shown in tables 1 and 2 should be understood as being illustrative only, and not limiting.

Of course, it should be understood that fulfillment orders will not necessarily be limited to a single order for a single SKU as shown above in table 1. In a real order, there would likely be a greater number of rows representing different SKUs, and/or different stores. Similarly, the planogram information would not necessarily be limited to a table for a single store (e.g., store 101), and the technology disclosed herein could be implemented to be able to accommodate tables for multiple stores (e.g., by recognizing different store IDs in different rows of the tables). Also, it should be understood that, while FIG. 1 depicts the fulfillment orders and planogram information being transmitted contemporaneously with one another, such contemporaneous transmission is not a requirement, and, in a real system, it is likely that the planogram information would have been provided in advance, as opposed to at the time of the fulfillment orders. It is also possible that the organization of components shown in FIG. 1 could vary in different implementations of the disclosed technology. For example, in some cases, rather than sending information to a server [105], which would then send it to the computer running the warehouse control software [107], stores [101][102][103] might send their information directly to the computer running the warehouse control software [107]. In such a case, the computer running the warehouse control software [107] might (but would not necessarily) report the information it had received to a central server [105] in an inventory management system. Accordingly, FIG. 1 and the related discussion, like tables 1 and 2, should be understood as being illustrative only, and should not be treated as limiting.

Figure 2A:
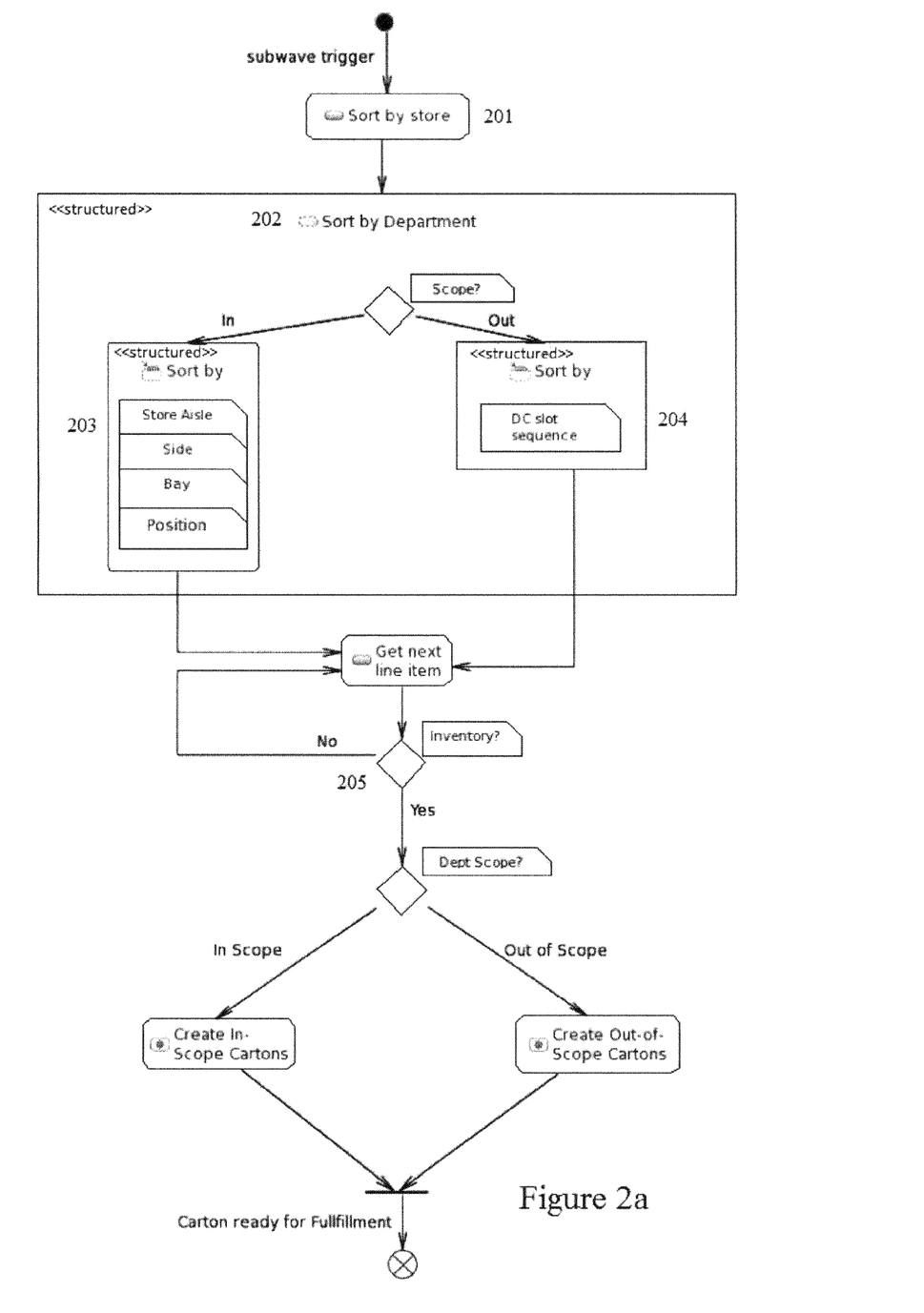
FIG. 2a depicts a flowchart of steps which could be performed to determine how to organize items for shipping.

Once information such as shown in tables 1 and 2 has been received by the computer running the warehouse control software [107] (or some other computer, if appropriate in a given implementation), that information can be used to determine the organization of items for shipping. Turning now to FIG. 2a, that figure provides a flowchart of steps which could be performed during that determination. Initially, the process of FIG. 2a is kicked off by a software trigger. As an example, such a software trigger could be timer of some sort (e.g., an instruction which triggers the processes described herein on a daily basis). There could also be multiple times. For example, for some divisions, such as products, departments or stores, cartonization could be performed on a daily basis, for others in a twice weekly basis, for others on an hourly basis. This could be accommodated by including information stating how often (for example) cartonization will be performed for a store when the list of stores is provided. Non-timer triggers are also possible. For example, the trigger could be receiving a list of items to be shipped, or receiving an explicit command from an external system (e.g., the central server [105]). Of course, combinations are also possible (e.g., a system might include both timer based triggers, as well as having the capability of being triggered by an external command). Other variations are also possible, and the discussion of triggers set forth herein should not be used as a basis for importing limitations into the claims in this application, or in any application claiming the benefit of this document. When the trigger is received, a list of stores (the store list), and items that need to be shipped to each store (the store order pool), are identified (e.g., by retrieving tables such as described previously, potentially after combining one or more tables, depending on the organization of the data as provided). Once this information is identified, the store list is sorted [201] by stores, so that the determination process can proceed for each individual store on the list. Then starting with the first store on the list, the order pool of that store is sorted [202] according to store departments (or some other top level used to organize the orders).

After the order pool has been sorted into separate departments, for each department, the items from the pool are further sorted in one of two different ways. For departments where planogram information is available (in-scope departments), the items are further sorted according to their specific locations in the planogram [203], such as the aisle on which they will be displayed in the store, the bay and side of the aisle on which they will be placed, and the position those items have been assigned in their bays. For departments where planogram information is not available (out-of-scope departments), the items are sorted according to the standard approach taken in the DC [204], such as sorting according to where the items are located in the DC to reduce worker travel time for item picking. After the items in the store order pool have been sorted, for each item in the pool, a check is made [205] to verify that the item can be allocated (e.g., confirming that the item is in stock at the DC, and has been placed on a shelf for picking). If the item can be allocated, then it is removed from the order pool and cartonized according to the processes of FIGS. 2b and 2c discussed below. Otherwise, the item is skipped so that it can be included in a future cartonization when it is in ready for allocation.

Figure 2B:
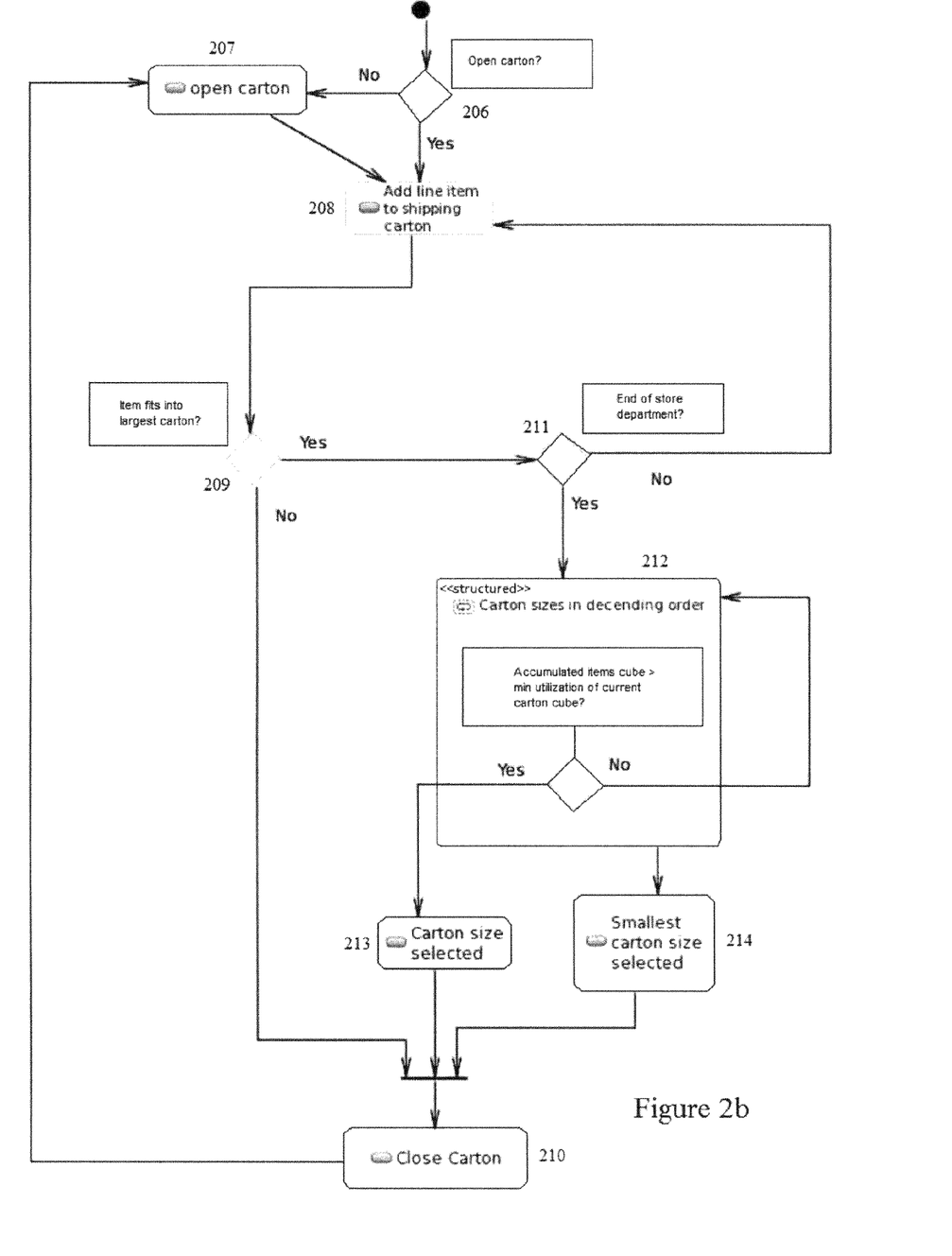
FIG. 2b depicts a series of steps which could be performed for cartonizing items associated with out-of-scope departments.

Turning first to FIG. 2b, that figure depicts a series of steps which could be performed for cartonizing items associated with in-scope departments. For ease of comprehension, the discussion below is set forth in terms of steps that could be performed using computer software that manipulates data structures having the same names as physical entities that would be manipulated when a cartonization plan created by the software is implemented (e.g., by providing warehouse workers with a pick list, or picking instructions via a pick to light system). For example, the discussion below includes references to cartons, which could be represented as data structures in a computer memory, as well as being physical containers into which items are placed. However, it should be understood that the object oriented approach described below is not a requirement for implementing the disclosed technology, and that other approaches (e.g., procedural programming) could also be used. It should be understood that the same or similar steps could also be performed physically when items are being added to containers (e.g., cartons or totes) for shipment.

Returning to the actual steps depicted in the figures, as shown in FIG. 2b, the first step in the process could be to determine if there is already an open carton [206], that is, a carton which is having items assigned to it, and is not closed. If there is not, a carton is opened [207] (which could be represented by flipping an open flag on a carton data structure). Otherwise, an item is added to the carton [208] (e.g., by adding a pointer to an object representing the item to a linked list stored in a carton data structure) in the order determined during the sorting and inventory check steps described in the context of FIG. 2a. Once the item is added, a check is made to verify that the item (or cube of the accumulated items, a concept discussed infra) actually fits into the carton [209], assuming an empty carton of the largest size. If not, then the carton is assigned the maximum carton size for the items that are already in it (assuming that the carton data structure does not have a size assigned until after it has already been filled), and it is closed [210]. The item that did not fit could then be added to the next carton.

On the other hand, if the item does fit, a check can be made to see if the item is the last item for the department [211]. If the item is the last item for the department, then a size is assigned to the carton using a size assignment algorithm [212]. As an illustration, the size assignment algorithm [212] can operate by using list of available carton sizes sorted in descending order of size, and a cube representing the volume occupied by the items assigned to the carton (the cube of the items, or the item cube). For each size on the list, the algorithm [212] checks whether the item cube can fit in the carton and, if it can, whether it is of sufficient size to meet a minimum utilization for that size of carton. If the minimum utilization can be achieved for only one carton size which is large enough to contain the cube, then that size is assigned to the carton [213]. Otherwise, the carton is assigned the smallest size which can contain the cube [214]. Once the carton size is assigned, the carton is closed [210], and the process can continue with the next item to be shipped. If that item to be shipped is part of another out-of-scope department, then it could be handled using the process of FIG. 2b, described above. Otherwise, if it was associated with an in-scope department, it could be handled according to the process of FIG. 2c.

Figure 2C:
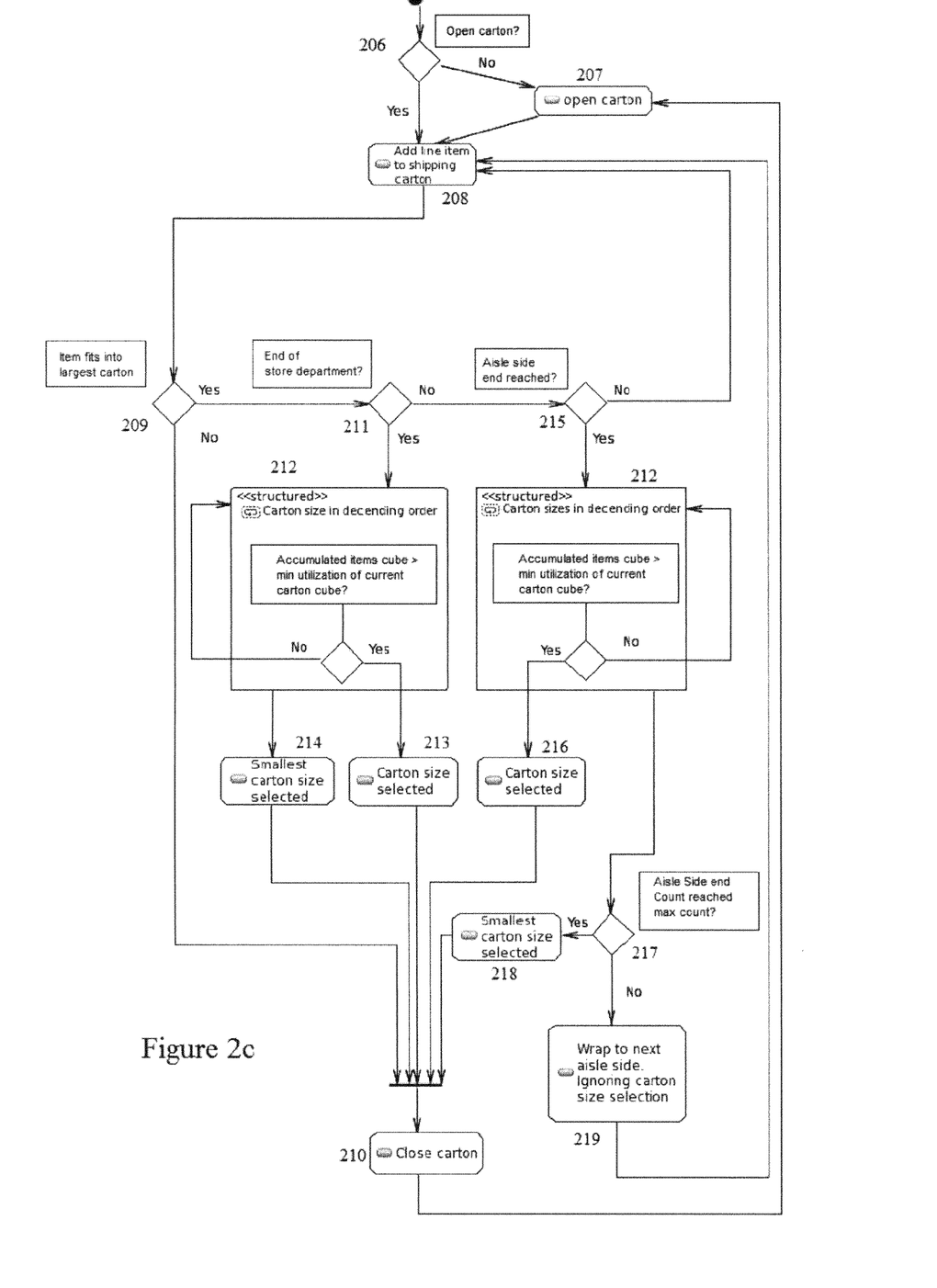
FIG. 2c depicts a series of steps which could be performed for cartonizing items associated with in-scope departments.

As can be seen in FIG. 2c, there can be substantial overlap in the handling of items for in-scope and out-of-scope departments. For example, similar steps can be taken to check if an item will fit into the open carton [209], to assign carton sizes if it will not fit, to check if it is the last item in the department [211] if it does fit, and to handle the item if it is the last item in the department [212][213][214]. However, in the event that the check for whether an item in an in-scope department is the last item in the department [211] comes up negative, the process of FIG. 2c continues with checks to reflect planogram information which are not present in the process of FIG. 2b. In particular, the process of FIG. 2c continues with a check of whether the item which was added to the carton is the last item on the current aisle side [215]. If the item which was added was not the last item for the current aisle side, the process continues with the next item on the list [208]. If the item added was the last item for the aisle side, then a series of checks is made to determine if the carton can be closed.

The first check to determine if the carton can be closed at the end of the aisle side is to determine if there is an available carton size which is large enough to fit the item cube, but small enough that the item cube meets the minimum utilization requirements for the carton. This can be performed using the size assignment algorithm [212] discussed in the context of FIG. 2b. If there is at least one carton size that fits those requirements, then the carton is assigned the smallest size that fits those requirements [216], and the carton is closed [210]. However, if there is no carton size that fits those requirements, then a check is made as to whether the aisle end count (i.e., the number of aisles represented by the products in a container) for the current open carton exceeds a threshold number [217]. This threshold number could be set in a variety of manners. For example, it could be configurable (for instance, by the entity operating the endpoints, by the entity operating the DC, by some other entity, or by some combination of the foregoing options) so that an appropriate tradeoff can be made between factors such as desire for container utilization, and the desire to save labor at the DC and/or endpoint store. Alternatively, the threshold could be a non-configurable number, such as one (i.e., only one aisle per container). Regardless of how the threshold is determined, if it is exceeded, then the carton is assigned the smallest size [218], closed [210], and a new carton is opened [207] so the next item can be added [208]. Otherwise, the current carton will be allowed to wrap to the next aisle side [219], and the process proceeds with the next item [208].

Of course, it should be understood that the above discussion of FIGS. 2a-2c is intended to be illustrative only, and that the inventors contemplate that there could be numerous potential variations and modifications on the approach described which could be implemented by those of ordinary skill in the art in light this disclosure. For example, while the discussion of FIG. 2c accommodated planogram information by making a check on whether an item was the last item in an aisle side [215], in other embodiments different types of checks could be made, such as whether the item which had been added was the last item in an aisle side bay (i.e., a finer level of granularity), or whether it was the last item in the aisle (i.e., a coarser level of granularity). Additionally, as an alternative to having the 2-3 checks shown in FIGS. 2b-2c, some embodiments could have greater (or lesser) levels of checking, such as cascading checks for each level in a planogram hierarchy (e.g., aisle, side, bay, position). As yet another variation, as an alternative to simply having in-scope and out-of-scope departments, in some implementations, departments could vary by having differing levels of organization (e.g., department 1 would be organized at the aisle side level, department 2 would be organized at the aisle level, and department 3 would be organized at the bay level), or the in-scope/out-of-scope type designations could be made at a level other than departments (e.g., stores, aisles, etc). Of course, the scheme used to organize items will likely vary as well, and the store→department→aisle→side→bay→position scheme discussed in the context of FIGS. 2a-2c may not be appropriate in all situations. What scheme is used in a particular case will depend on the needs of the stores which the products are ultimately being shipped to.

Figure 3:
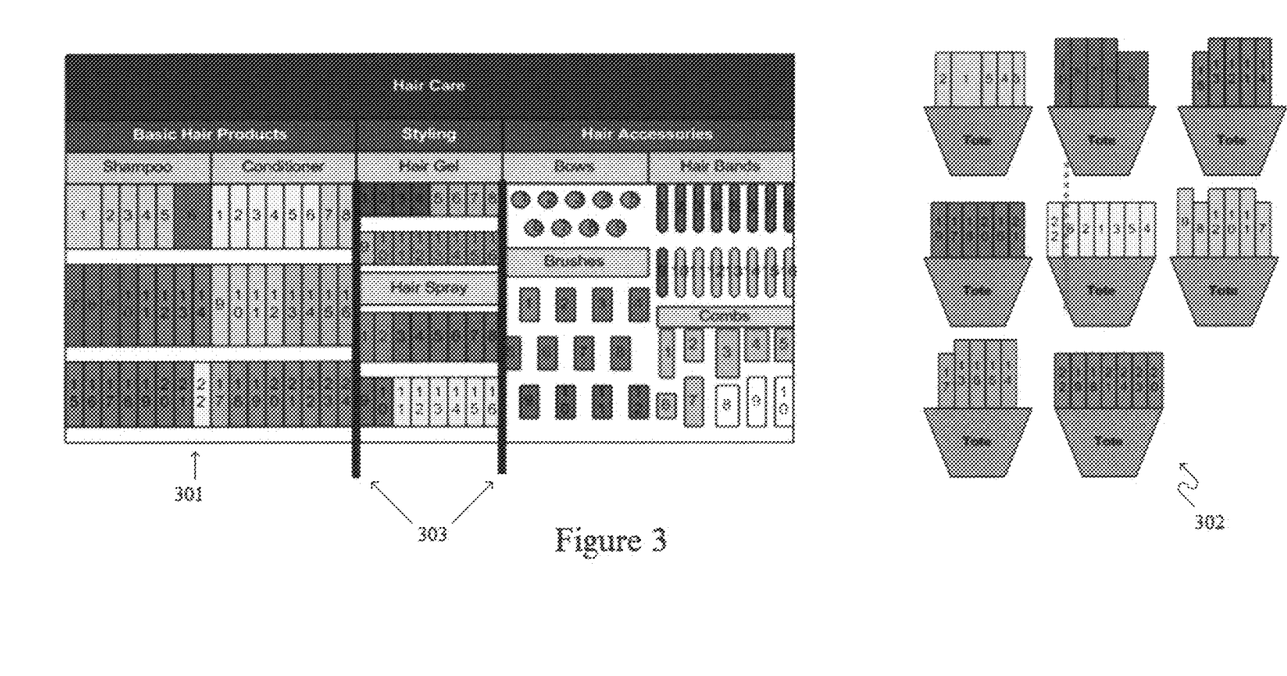
FIG. 3 depicts how items can be organized in a store and corresponding organization for totes used in shipping those items.

As an example of types of variations which could be implemented in certain situations, consider the diagrams of FIG. 3. FIG. 3 presents graphical illustrations of how products might be organized within a hair care department [301] and an organization plan [302] for totes that would be used to ship items for replenishing inventory in that department. In the exemplary organization of FIG. 3, products are organized into macro-subgroups (e.g., basic hair products, styling, hair accessories), micro-subgroups (e.g., bows, hair bands, combs) and positions (e.g., locations of products within a particular micro sub-group). The totes reflect this organization by grouping items even at the shelf position level for the purpose of planning which items will be placed in which totes. This is indicated in FIG. 3 through the use of color, where items in the hair care department [301] which will be included in a single tote are illustrated in a single color.

Note though, that the items in the plans for the totes [302] of FIG. 3 are not necessarily placed in to the totes in position sequence. This illustrates that, in some embodiment, rather than simply planning container strategies based on store layouts, there could be hybrid approaches, such as sorting items according to the aisles and aisle sides they would be given in a store, then sorting items on the same side of an aisle based on their position in a DC, rather than their position within the aisle side. This could be done to optimize the total of the travel time in the DC, and travel time in the stores. Also, note that, in FIG. 3, there are hard breaks [303] between certain items that will be shipped to the store. These hard breaks [303] could represent rules requiring termination of a tote, such as rules restricting what products cannot be co-mingled due to handling restrictions, safety, and quality concerns. These rules could be implemented by adding another level of checks to a process such as shown in FIGS. 2a-2c, where if an item is followed by a hard break, the tote would be closed just as if the item were the last item in a department.

Instead of limiting the protection accorded by this application, or by any application which is related to this document, to the material explicitly disclosed herein, the protection should be understood to be defined by the following claims, which are drafted to reflect the scope of protection sought by the inventors when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "based on" should be understood to mean that something is determined at least in part by the thing that it is indicated as being "based on." When something is completely determined by a thing, it will be described as being "based EXCLUSIVELY on" the thing.

When used in the claims, a "boundary group" should be understood to be a group (defined infra), the products grouped into which will not be allocated to a container that also has allocated to it products that are not grouped into that "boundary group." As an example of this, consider the treatment of a department from FIGS. 2a-2c. As illustrated in FIG. 2c, and described in the associated text, if a product to be added to a container is the last product in a department, then the container will be closed and no products from the next department will be added to that container. Of course, it should be noted that the example of a department as a boundary group is intended to be illustrative only, and that other types of boundary groups are also possible (e.g., boundary groups defined to create hard breaks, as described in the discussion accompanying FIG. 3). Accordingly, despite being provided under the heading of "Explicit Definitions," the example of departments as boundary groups should not be treated as implying limitations on the claims set forth herein, or in any document which claims the benefit of this disclosure.

When used in the claims, a "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, PLCs and portable game consoles.

When used in the claims, a "computer memory" should be understood to refer to any object, substance, or combination of objects or substances, capable of storing data or instructions in a form in which they can be retrieved and/or processed by a computer. A computer memory should not be limited to any particular type or organization, and should be understood to include distributed and decentralized systems however they are physically or logically disposed, as well as storage objects of systems which are located in a defined and/or circumscribed physical and/or logical space. Computer readable media such as hard discs, read only memory, random access memory, solid state memory elements, optical discs and registers are all examples of "computer memory."

When used in the claims, a "condition group" should be understood to refer to a group (defined infra) where the allocation of the last product from the "condition group" into a container triggers evaluation of a condition to determine if additional products should be allocated to that container. As an example of this, consider the treatment of an aisle side from FIGS. 2a-2c. As illustrated in FIG. 2c, and described in the associated text, if a product to be added to a container is the last product on an aisle side, then one or more conditions (e.g., whether the aisle end count for the container exceeds a threshold) will be tested to determine if additional products should be added to the container. Of course, it should be understood that the example of an aisle side as a condition group is intended to be illustrative only, and that various embodiments which use condition groups may or may not use aisle sides (e.g., as shown in FIG. 3, in some cases, products may not be organized according to aisle sides). Accordingly, despite being provided under the heading of "Explicit Definitions," the example of aisle sides as condition groups should not be treated as implying limitations on the claims set forth herein, or in any document which claims the benefit of this disclosure.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, a "container" should be understood to refer to an object used for or capable of holding other objects, such as for shipping or storage. Examples of "containers" include cartons and totes.

When used in the claims, a "conveyor" should be understood to refer to a machine adapted to transport physical items between various locations. A conveyor belt is an example of a "conveyor."

When used in the claims, "determining" (and various forms thereof) should be understood to refer to the act of generating, selecting or otherwise specifying something. For example, to obtain an output as the result of analysis would be an example of "determining" that output. As a second example, to choose a response from a list of possible responses would be a method of "determining" a response.

When used in the claims, a "direct subgroup" should be understood to be a subgroup of a group (both terms defined infra) which is not also subgroup of any other subgroup of the group.

When used in the claims, a "distribution center" should be understood to be a warehouse or other building or set of buildings or portion of a building or set of buildings where products are received and reorganized for shipment.

When used in the claims, a "fulfillment order" should be understood to be an order for products to be shipped to one or more locations, such as where the products can be provided to or consumed by end consumers.

When used in the claims, a "group" should be understood as being a classification according to which individual products can be organized (i.e., grouped into the group). To illustrate the concept of a "group," consider the treatment of the departments, aisles and aisle sides from FIGS. 2a-2c, which were used to organize individual products. Also, as illustrated in that example, it is possible that a product might be grouped into more than one group (e.g., a product could be organized according to department, aisle, aisle side, and bin).

When used in the claims, a "hierarchy" should be understood to refer to an organization in which various elements are classified in successive elements or layers.

When used in the claims, an "in scope group" should be understood to refer to a group where, in a plan for placing products into containers based on how the products will be used in store replenishment, the container the products from the in scope group will be placed into is determined from how they will be used in store replenishment at the level of the in scope group.

When used in the claims, a "maximum container size" should be understood to refer to the largest size container available for transporting products. For example, if a distribution center has containers with sizes of 100 cubic inches, 10 cubic inches, and one cubic inch, then 1000 cubic inches would be the maximum container size. Of course, it should be noted that references to a maximum container size do not necessarily reflect the existence of multiple containers sizes, and that if a distribution center has only containers of 10 cubic inches, then 10 cubic inches would be the maximum container size, even though it might not be the maximum container size in a different context.

When used in the claims, a "means for determining a plan for placing products into containers based on how the products will be used for store replenishment" should be understood as a limitation set forth in means plus function form as provided for in 35 U.S.C. §112 ¶ 6. An example of a "means" for performing the specified function would be a computer which is configured to perform the algorithm discussed in the context of FIG. 2c. Of course, it should be understood that the "means" are not limited to computer configured to perform the algorithm of FIG. 2c, and that the structure which corresponds to the specified function of the means may also be a computer configured to perform other steps in addition to those of FIG. 2c (e.g., as shown in the relationship between FIGS. 2a-2c) or variations on the steps of FIG. 2c (e.g., as illustrated in the discussion of FIGS. 2a-2c, as well as illustrated in FIG. 3 and the associated discussion).

When used in the claims, a "means for determining the plan for placing products into containers based on how the products are situated in the distribution center" should be understood as a limitation set forth in means plus function form as provided for in 35 U.S.C. §112 ¶ 6. An example of a "means" for performing the specified function would be a computer which is configured to perform the algorithm discussed in the context of FIG. 2b. Of course, it should be understood that, as with the "means for determining a plan for placing products into containers based on how the products will be used for store replenishment," the "means for determining the plan for placing products into containers based on how the products are situated in the distribution center" are not limited to only a computer configured to perform the algorithm of FIG. 2b. For example, it is possible that a single computer could be configured as both a "means for determining the plan for placing products into containers based on how the products are situated in the distribution center" and a "means for determining a plan for placing products into containers based on how the products will be used for store replenishment." One example of such configuration are provided in the discussion of FIGS. 2a-2c, where some products (those in in scope departments) are placed into containers according to how they will be used in store replenishment, while other products (those in out of scope departments) are placed into containers according to how they are situated in the distribution center. Another example of such a configuration is a case where a product is initially assigned to a container based on how it will be used in store replenishment, and is also assigned to a container based on its situation in a distribution center (e.g., a product may be assigned to a container based on its department, aisle, aisle side, and bin, but, rather than also assigning it to a container based on its specific position in the bin, the final level of sorting used in assigning the product to a container would be based on where the product is situated in the distribution center).

When the claims state that something operates on a "multiple container basis," it should be understood to mean that that which operates on a "multiple container basis" performs its task based on consideration of the impact of its task on multiple containers, rather than only focusing on performing the task on a container by container basis. For example, creating a plan for how products should be added to containers can operated on a multiple container basis by optimizing the assignment of products to containers across containers (e.g., by balancing products organized into a single group across containers, rather than maximizing products that can be assigned on a container by container basis, which can result in the last products in the group being assigned to a container which is larger than necessary).

When used in the claims, an "out of scope group" should be understood to be a group where, in a plan for placing products into containers based on how the products will be used in store replenishment, the container the products from the out of scope group will be placed into is determined from factors other than how they will be used in store replenishment at the level of the out of scope group.

When used in the claims, a "pick face" should be understood to refer to a portion of a picking system (defined infra) which provides simultaneous access to a plurality of products to be removed from the picking system and added to containers.

When used in the claims, a "pick to light system" should be understood to refer to a picking system in which lights provide instructions indicating products which should be removed from the picking system and added to containers.

When used in the claims, a "picking system" should be understood to refer to a system which stores products and provides access to a plurality of those products such that those products can be removed from the picking system according to some type of instructions. The instructions according to which products will be removed from the picking system can be provided in different manners depending on the type of picking system (e.g., pick to light systems provide the instructions using lights, voice pick systems provide those instructions through an audible interface, etc).

When used in the claims, a "product" should be understood to refer to an item (or group of such items) which can be used in store replenishment and provided to a consumer from a retail location.

When used in the claims, a "set" should be understood to refer to a number, or combination of zero or more things of similar nature, design, or function (e.g., because they are grouped into a single group).

When used in the claims, "sorting according to a hierarchy" should be understood to mean placing the items to be sorted into an order according to their placement in a first level of a hierarchy, then placing the sorted items into order according to their placement according to one or more lower levels of the hierarchy. At each level of sorting, the sorting according to the lower level is not allowed to change the order to the items being sorted so as to interfere with the sorting at higher levels which has already taken place. An example of "sorting according to a hierarchy" is provided in the discussion of FIG. 2a, where products are sorted into separate departments, and then in-scope products are sorted according to one or more lower levels of the hierarchy.

When used in the claims, "store replenishment" should be understood to mean the process of adding inventory to store shelves to replace products that had been previously removed (e.g., because they had been purchased by consumers).

When used in the claims, a "subgroup" should be understood to mean a first group where the set of products which are grouped into the first group is a subset of the products grouped into a second group which the first group is a "subset" of.

When used in the claims, "the functions for the means comprise" should be understood to mean that the "means" corresponds to structures which perform at least the functions specified after the word "comprise." An example of such a multi-function means would be a computer which is configured to perform multiple functions (e.g., by different programs or modules).

The invention claimed is:

1. A machine for fulfillment of orders in a distribution center comprising:
   a. a pick face, the pick face adapted to allow products to be taken from the pick face and placed into containers; and
   b. a means for determining a plan for placing products into containers based on how the products will be used in store replenishment;
      wherein the means for determining the plan for placing products into containers based on how the products will be used in store replenishment operates based on information grouping the products into a plurality of groups which treats a first group from the plurality of groups as an in scope group and a second group from the plurality of groups as an out of scope group.

2. The machine of claim 1, wherein:
   a) the pick face is part of a pick to light system;
   b) lights on the pick to light system are operated based on the means for determining the plan for placing products into containers based on how the products will be used in store replenishment; and
   c) the machine comprises a voice directed picking system.

3. The machine of claim 2 wherein commands provided by the voice directed picking system are based on the means for determining the plan for placing products into containers based on how the products will be used in store replenishment.

4. The machine of claim 1, wherein the means for determining the plan for placing products into containers based on how the products will be used in store replenishment operates on a multiple container basis.

5. The machine of claim 1, wherein the second group is a subgroup of a third group from the plurality of groups.

6. The machine of claim 1, wherein the functions for the means comprise:
   a) determining the plan for placing products into containers based on how the products will be used in store replenishment; and
   b) determining the plan for placing products into containers based on how the products are situated in the distribution center.

7. A method comprising:
   a) receiving a fulfillment order specifying a plurality of products to be used in store replenishment at one or more stores;
   b) in a computer memory, determining a plan for placing products from the plurality of products into containers based on how the products will be used in store replenishment; and
   c) outputting instructions to a picking system indicating products to be placed into containers based on the plan; wherein store is defined as an establishment where products are sold.

8. The method of claim 7, comprising, in the computer memory, sorting the plurality of products according to one or more levels in a hierarchy, wherein:
   a) the hierarchy comprises a plurality of levels;
   b) a set of the plurality of levels in the hierarchy comprise groups;
   c) each product from the plurality of products has a position in the hierarchy, the position in the hierarchy indicating that the product is grouped into a set of groups, the set of groups comprising:
      i) one highest group which is not a subgroup of any other group in the set of groups; and,
      ii) one or more descendant groups, each of which is a subgroup of another group in the set of groups;
      the set of groups the product is grouped into indicating how the product will be used in store replenishment; and
   d) when a product is identified as grouped in an in scope group, the product is sorted according to any levels of the hierarchy which contain a group which is a direct subgroup of the in scope group.

9. The method of claim 8 wherein when a product is identified as grouped in an out of scope group, the product is not sorted according to any of the levels of the hierarchy which comprise one or more subgroups of the out of scope group.

10. The method of claim 7, wherein determining the plan for placing products from the plurality of products into containers based on how the products will be used in store replenishment comprises:
    a) performing one or more determinations taken from a set of determinations consisting of:
       i) determining whether a combination comprising
          a set of products assigned to a container; and
          a product to be assigned cannot fit in a maximum container size;
       ii) determining whether the product to be assigned is the last product in a boundary group associated with the product to be assigned;
       iii) determining whether the product to be assigned is the last product in a condition group associated with the product to be assigned, and, if the product to be assigned is the last product in the condition group associated with the product to be assigned, whether a condition associated with the condition group is violated by assigning an additional product after the product to be assigned to the container; and
    b) if any of the determinations from the set of determinations is true, indicating that no additional products can be assigned to the container.

11. The method of claim 10 further comprising, if any of the determinations from the set of determinations is true, assigning a size to the container.

12. The method of claim 11, wherein assigning the size to the container comprises modifying data representing, in the computer memory, a container into which the products to be assigned a container are to be placed, to indicate the container into which the products to be assigned a container are to be placed has the assigned size.

13. The method of claim 7, wherein:
    a) the method comprises sorting the plurality of products according to store replenishment location information comprising departments, aisles, and aisle sides where products from the plurality of products will be placed during store replenishment;
    b) determining the plan for placing products from the plurality of products into containers based on how the products will be used in store replenishment comprises, for each product from the plurality of products which will be placed in an in scope department during store replenishment:

i) performing one or more determinations from a set of determinations consisting of:
   A) determining whether a combination comprising the product and a set of already assigned products cannot fit in a container of maximum size;
   B) determining whether the product is the last product in the aisle on which it will be placed during store replenishment; and
   C) determining whether a rule associated with handling, safety or quality would be violated by assigning the product to a single container with the set of already assigned products;
ii) if any of the determinations from the set of determinations is true, performing acts comprising:
   A) indicating that no additional products can be assigned to the container into which the set of already assigned products are to be placed; and
   B) assigning a size to the container into which the set of already assigned products are to be placed.

14. A method, comprising:
a) receiving, at a warehouse control computer, a fulfillment order indicating a plurality of products;
b) identifying, at the warehouse control computer, a store to which each of the plurality of products is to be shipped;
c) determining, at the warehouse control computer, a plan for placing each of the plurality of products into a set of cartons based on layout information stored in a memory accessible by the warehouse control computer for each identified store to which each of the plurality of products is to be shipped;
d) generating, at the warehouse control computer, a set of instructions to control an operation of a cartonization system to control which of the plurality of products should be added to each carton of the set of cartons based at least in part on the determined plan; and
e) sending the set of instructions from the warehouse control computer to the cartonization system;
wherein the memory accessible by the warehouse control computer has stored therein unique layout information for each identified store; and
wherein determining, at the warehouse control computer, a plan for placing each of the plurality of products into a set of cartons based on layout information stored in a memory accessible by the warehouse control computer for each identified store to which each of the plurality of products is to be shipped comprises:
   i) identifying, at the warehouse control computer, a location of each of the plurality of products in each identified store to which each of the plurality of products is to be shipped based on the layout information for each identified store; and
   ii) assigning each of the plurality of products to the set of cartons in the plan such that locations of products in any one carton of the set of cartons in the plan do not violate an adjacency grouping rule.

15. The method of claim 14, wherein the layout information of each identified store is a planogram indicating a department, an aisle, an aisle side, a bay, a shelf, and a position that identifies the location of each of the plurality of products in that respective store.

16. The method of claim 15, wherein the adjacency grouping rule is a requirement that products have the same handling, safety, and quality restrictions.

17. The method of claim 15, wherein the adjacency grouping rule is a requirement that the locations of products in any one carton of the set of cartons have a same department and same aisle.

18. The method of claim 17, wherein the adjacency grouping rule is a requirement that the locations of products in any one carton of the set of cartons have the same department, the same aisle, and a same aisle side.

19. A method comprising:
a) receiving a fulfillment order specifying a plurality of products to be used in store replenishment at one or more stores;
b) in a computer memory:
   i) sorting the plurality of products according to one or more levels in a hierarchy, wherein:
      A) the hierarchy comprises a plurality of levels;
      B) a set of the plurality of levels in the hierarchy comprise groups;
      C) each product from the plurality of products has a position in the hierarchy, the position in the hierarchy indicating that the product is grouped into a set of groups, the set of groups comprising:
         I) one highest group which is not a subgroup of any other group in the set of groups; and,
         II) one or more descendant groups, each of which is a subgroup of another group in the set of groups;
         the set of groups the product is grouped into indicating how the product will be used in store replenishment; and
      D) when a product is identified as grouped in an in scope group, the product is sorted according to any levels of the hierarchy which contain a group which is a direct subgroup of the in scope group; and
   ii) determining a plan for placing products from the plurality of products into containers based on how the products will be used in store replenishment;
c) outputting instructions to a picking system indicating products to be placed into containers based on the plan.

20. The method of claim 19 wherein when a product is identified as grouped in an out of scope group, the product is not sorted according to any of the levels of the hierarchy which comprise one or more subgroups of the out of scope group.

21. A method comprising:
a) receiving a fulfillment order specifying a plurality of products to be used in store replenishment at one or more stores;
b) in a computer memory, determining a plan for placing products from the plurality of products into containers based on how the products will be used in store replenishment, wherein determining the plan for placing products from the plurality of products into containers based on how the products will be used in store replenishment comprises:
   i) performing one or more determinations taken from a set of determinations consisting of:
      A) determining whether a combination comprising
         I) a set of products assigned to a container; and
         II) a product to be assigned cannot fit in a maximum container size;
      B) determining whether the product to be assigned is the last product in a boundary group associated with the product to be assigned;
      C) determining whether the product to be assigned is the last product in a condition group associated with the product to be assigned, and, if the product to be assigned is the last product in the condition group associated with the product to be assigned, whether a condition associated with the condition group is violated by assigning an additional product after the product to be assigned to the container; and ii) if any of the determinations from the set of determinations is true, indicating that no additional products can be assigned to the container; and c) outputting instructions to a picking system indicating products to be placed into containers based on the plan.

22. The method of claim 21 further comprising, if any of the determinations from the set of determinations is true, assigning a size to the container.

23. The method of claim 22, wherein assigning the size to the container comprises modifying data representing, in the computer memory, a container into which the products to be assigned a container are to be placed, to indicate the container into which the products to be assigned a container are to be placed has the assigned size.

* * * * *